(12) United States Patent
Vranish

(10) Patent No.: US 6,640,949 B1
(45) Date of Patent: Nov. 4, 2003

(54) 1-WAY BEARING

(75) Inventor: John M. Vranish, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/095,343

(22) Filed: Mar. 1, 2002

Related U.S. Application Data

(60) Provisional application No. 60/273,478, filed on Mar. 3, 2001.

(51) Int. Cl.[7] .............................................. F16D 41/07
(52) U.S. Cl. ................. 192/45.1; 192/41 A; 192/110 B
(58) Field of Search .............................. 192/45.1, 41 A, 192/110 B; 384/565

(56) References Cited

U.S. PATENT DOCUMENTS

| | | | | |
|---|---|---|---|---|
| 2,268,376 A | * | 12/1941 | Dodge .................... | 192/45.1 |
| 2,307,881 A | * | 1/1943 | Dodge .................... | 192/45.1 |
| 2,383,595 A | * | 8/1945 | Dodge .................... | 192/45.1 |
| 2,407,772 A | * | 9/1946 | Dodge .................... | 192/45.1 |
| 3,006,447 A | * | 10/1961 | Irwin ..................... | 192/45.1 |
| 3,938,632 A | * | 2/1976 | Giese et al. ............. | 192/41 A |
| 4,998,605 A | * | 3/1991 | Ferris .................... | 192/41 A |
| 5,482,144 A | * | 1/1996 | Vranish .................. | 192/45.1 |
| 5,518,094 A | * | 5/1996 | Myrick ................... | 192/45.1 |
| 5,676,226 A | * | 10/1997 | Lampela et al. .......... | 192/45.1 |
| 5,819,899 A | * | 10/1998 | Iga et al. ................ | 192/45.1 |
| 5,868,226 A | * | 2/1999 | Vranish .................. | 192/45.1 |
| 5,967,267 A | * | 10/1999 | Vranish .................. | 192/45.1 |

\* cited by examiner

*Primary Examiner*—Rodney H. Bonck
(74) *Attorney, Agent, or Firm*—Keith L. Dixon

(57) ABSTRACT

A one-way bearing is provided having sprags and rolling bearings both disposed between an inner and an outer race. The sprags may comprise three-dimensional sprags for preventing rotation in a non-preferential direction. The rolling bearings may comprise thrust rollers for transmitting axial, tilt, and radial loads between the inner and outer races.

17 Claims, 7 Drawing Sheets

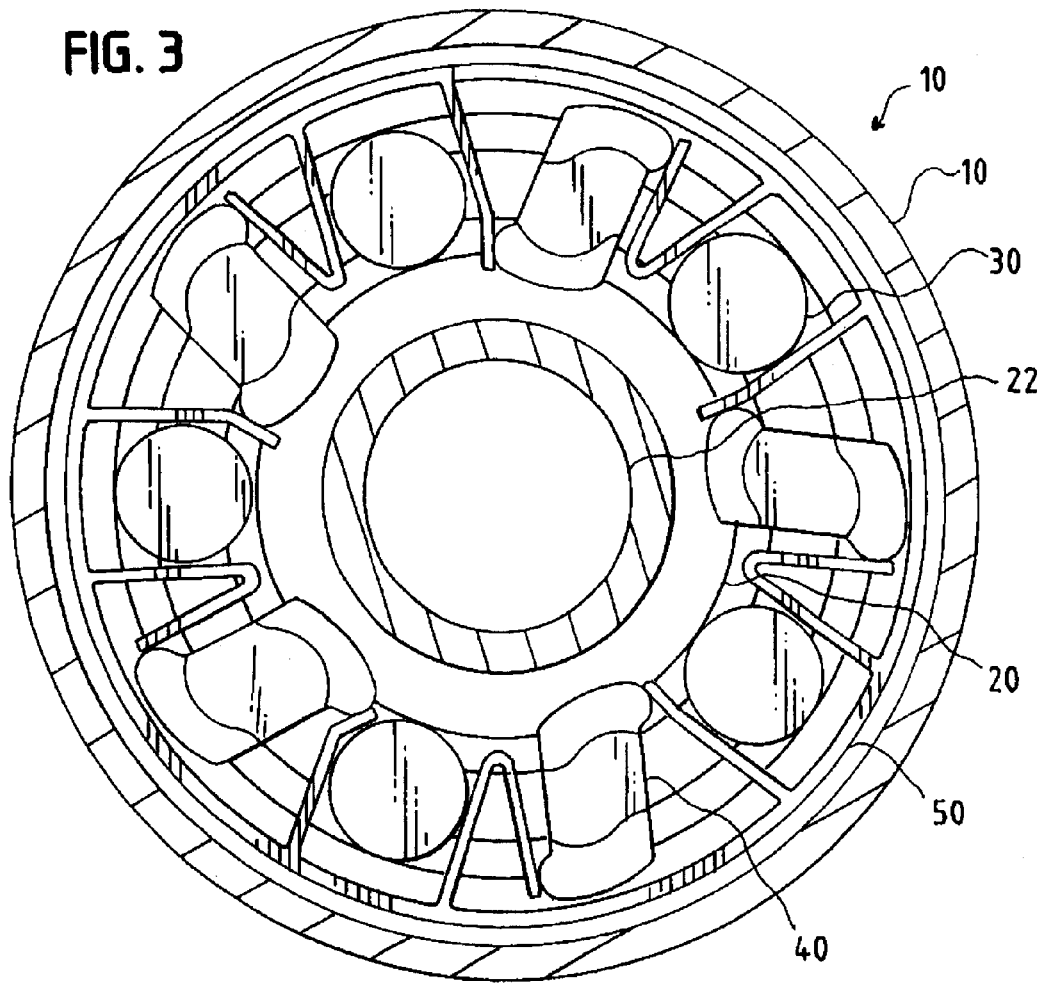

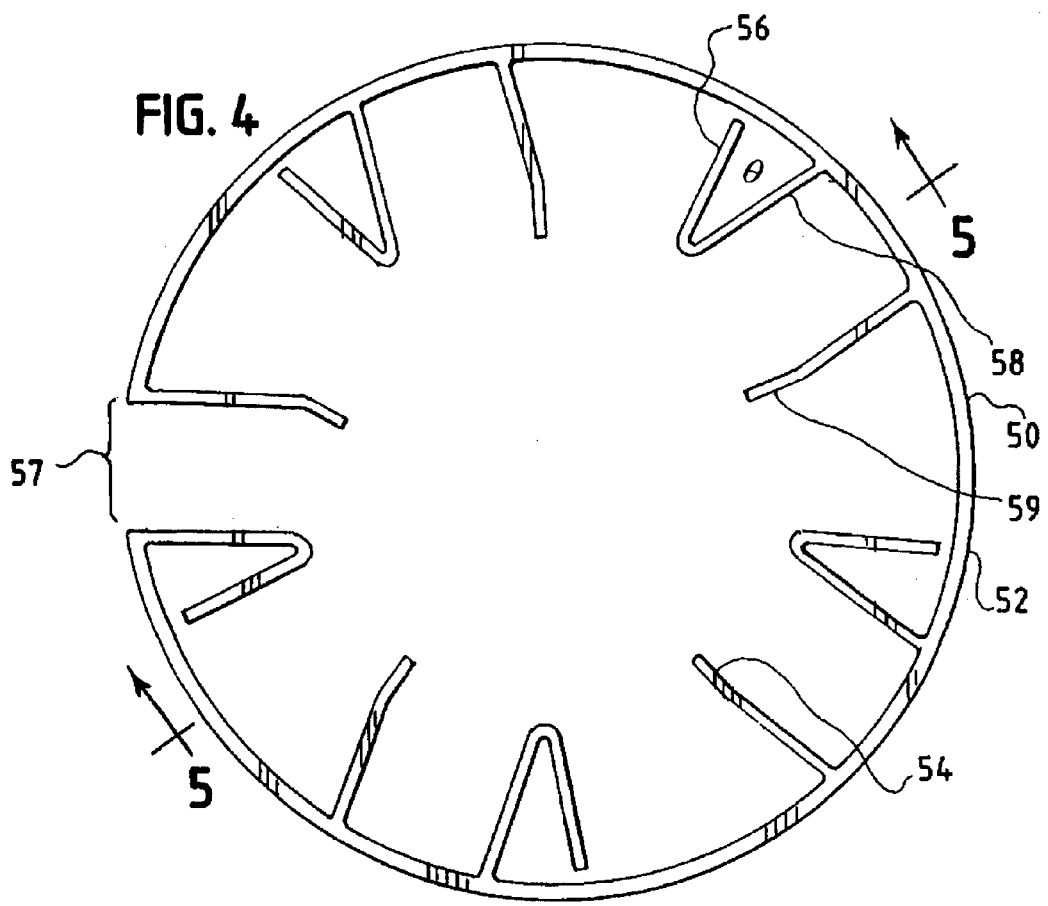
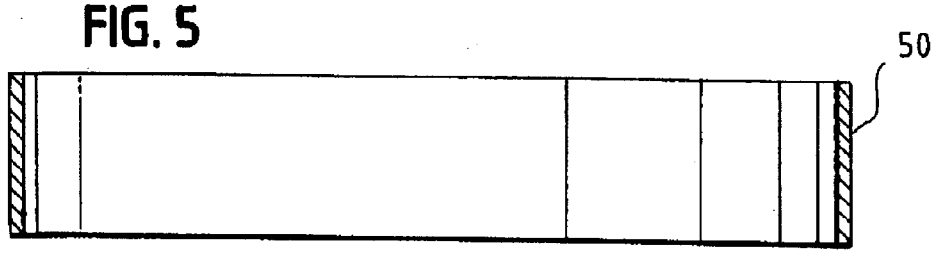

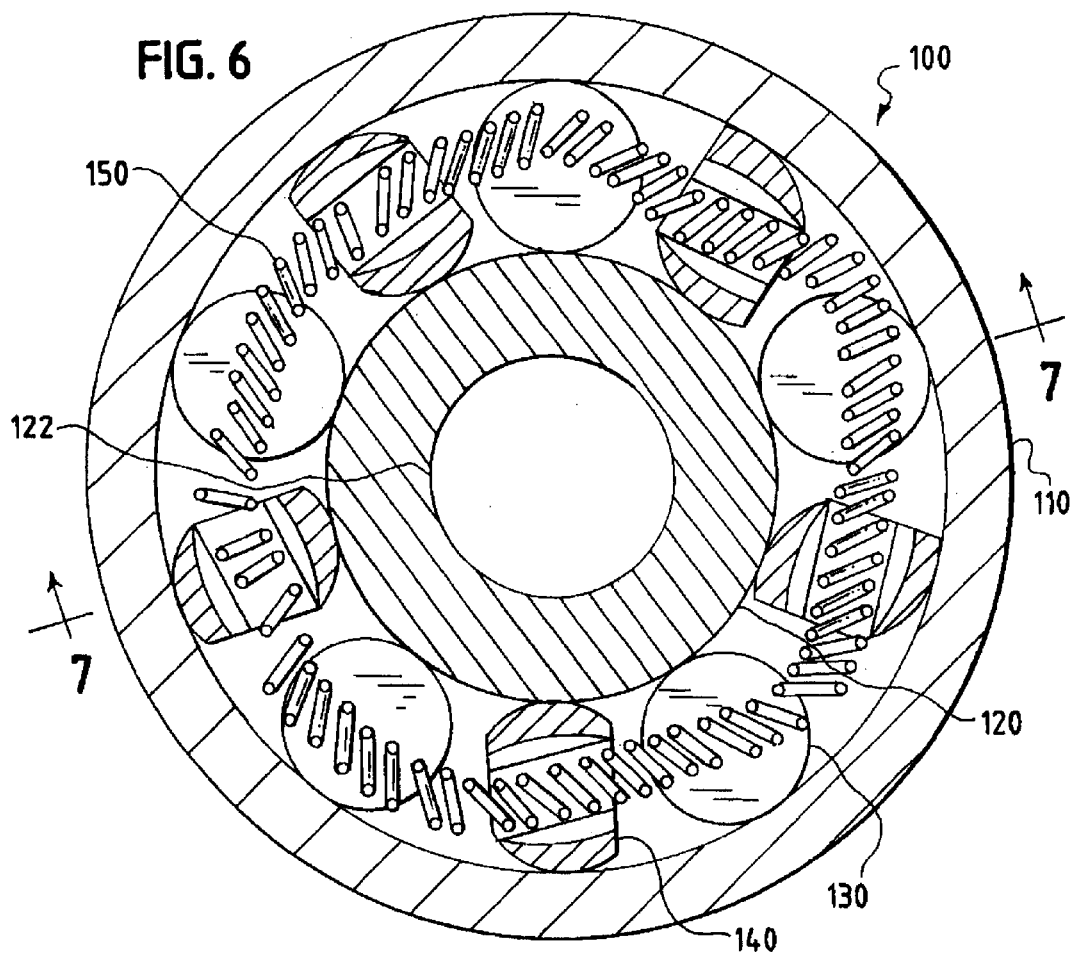
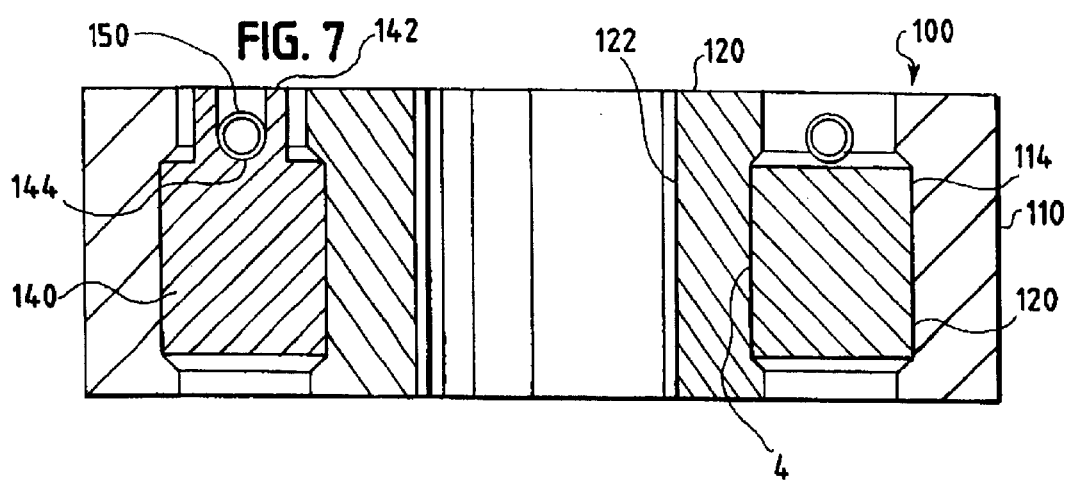

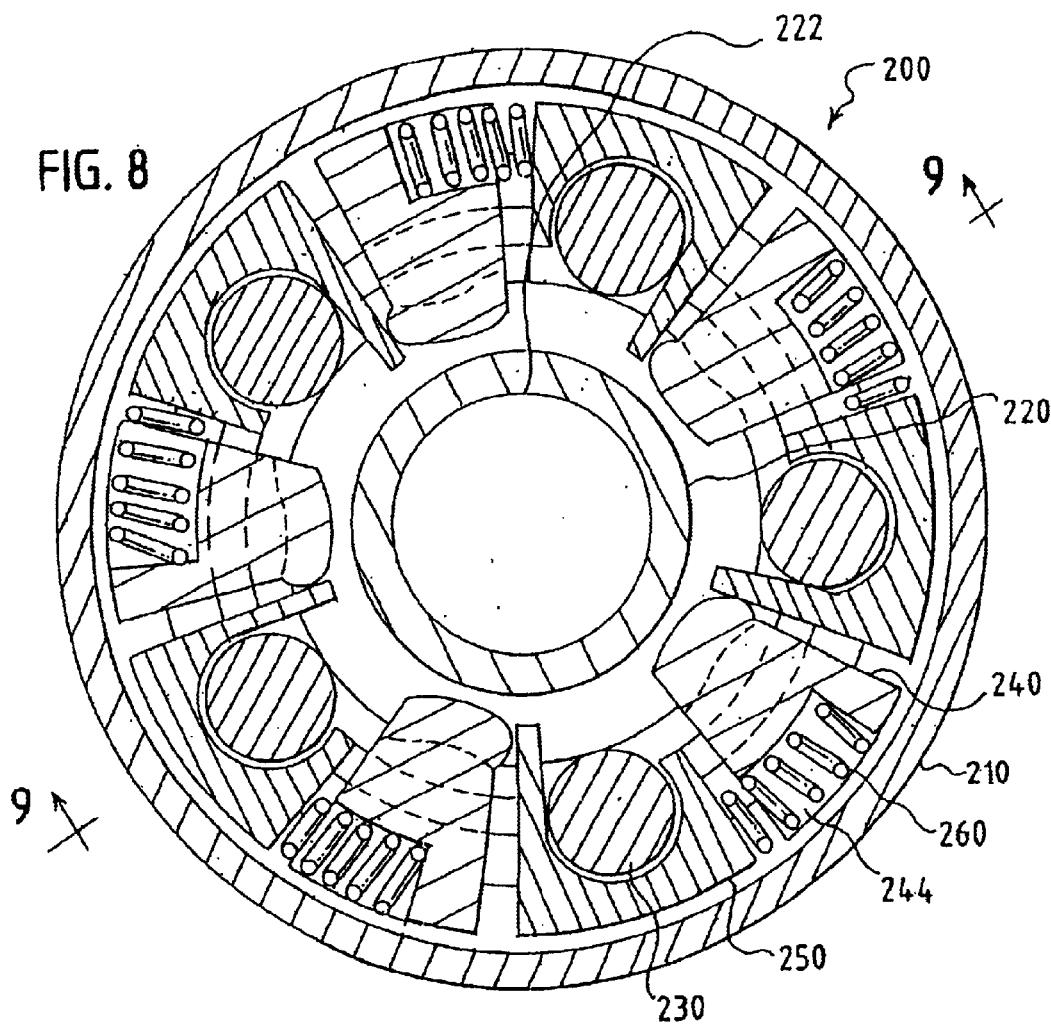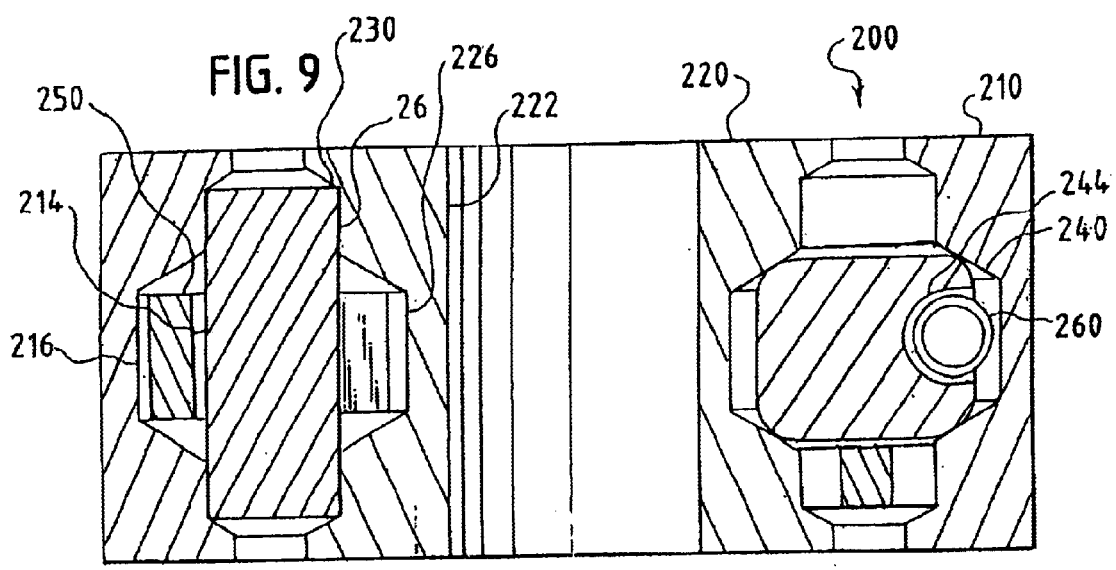

1-WAY BEARING

CROSS-REFERENCES TO RELATED APPLICATIONS

Priority is claimed under 35 U.S.C. § 119(e) from U.S. Provisional Patent Application No. 60/273,478, filed on Mar. 3, 2001.

ORIGIN OF INVENTION

The invention described herein was made by an employee of the United States Government, and may be manufactured and used by or for the Government for governmental purposes without the payment of any royalties thereon or therefor.

1. Field of the Invention

The invention relates generally to bearings, and more particularly to a one-way bearing that permits relative rotation of two machine components or the like in one direction while preventing rotation in the opposite direction.

2. Background Art

One-way bearings are commonly used in drive trains for vehicles, such as automobile and truck transmissions. One-way bearings may also be used in materials handling devices, such as elevators, cranes, and fork lifts. They may be employed in spacecraft, e.g., in rotating solar array panels, and aeronautics, e.g., in helicopters or tilt-rotor aircraft.

Typically, one way bearings include a first pair of dedicated concentric races containing sprags and a second pair of dedicated concentric races containing rolling bearings. The use of two different dedicated sets of races for the sprags and the rolling bearings adds to the size of typical one-way bearings, and may render them undesirable for certain applications.

Sprags typically used in one-way bearings may lack the strength for certain applications, reducing the effectiveness of the one-way bearing in preventing rotation in the non-preferential direction. Furthermore, typical sprags may not be suitable for use with certain lubricants. For example, in applications in outer space it may be necessary to use a lubricant to reduce friction between the sprags and races. The lubricant may hinder the ability of the typical sprags to prevent rotation of the bearing in the non-preferential direction.

Pawls have been used instead of sprags, but addition of pawls between a pair of dedicated concentric races significantly increases the size of a bearing. Pawls may have increased strength to prevent rotation of the one-way bearing in the non-preferential direction of rotation, as compared to typical sprags. However, pawls may not engage between the pair of races as quickly as typical sprags, and thus may not prevent rotation of the one-way bearing in the non-preferential direction as quickly as sprags. Delay in preventing rotation in the non-preferential direction may cause the pawls to impact and possibly damage or cause wear to the races.

The rolling bearings used in one-way clutches often are ball bearings. However, ball bearings may not be strong enough for certain applications, in particular applications where high thrust or axial loads are required to be transmitted by the bearings. Crossed roller bearings have been used for applications having axial loads, but can be expensive and may not be suitable for high speed applications. The strength advantages of crossed roller bearings may also be limited when tilt and radial loads must be transmitted in addition to axial loads.

Accordingly, there remains a need for a compact, high strength one-way bearing suitable for applications requiring rapid prevention of rotation in the non-preferential direction, while also able to withstand tilt, radial, and axial loads.

STATEMENT OF INVENTION

In accordance with the invention, an apparatus and method are provided for allowing relative rotation between an inner member and an outer member in a preferential direction and preventing rotation in an opposite, non-preferential direction. The apparatus and method are preferably embodied in a one-way bearing configured to minimize its size, provide sufficient locking force when rotated in the non-preferential direction, and withstand axial, radial, and tilt forces.

The one-way bearing comprises a single, dedicated pair of concentric races. Positioned between the races are both anti-rotation members and rolling bearing members. Providing only a single pair of dedicated concentric races for both the anti-rotation members and the rolling bearing members eliminates the need for two separate pairs of dedicated concentric races, thus enabling a more compact one-way bearing design.

The single pair of dedicated races include an inner race and an outer race. Each of the inner and outer races may include two separate sets of engagement surfaces. The anti-rotation members may be positioned to engage a first set of engagement surfaces, and the rolling bearing members a second set of engagement surfaces. Providing separate engagement surfaces for the anti-rotation members and the rolling bearings may reduce wear, provide smooth operation, and increase bearing life.

The engagement surfaces may comprise a pair of concentric grooves. A first concentric groove may be configured for engagement with the anti-rotation members and a second concentric groove may be configured for engagement with the rolling bearing members. The first groove may extend to a first depth. The second groove may begin at the first depth and extend to a second depth.

In an aspect of the invention, a carrier is positioned between the dedicated pair of concentric races. The carrier may function to maintain the anti-rotation members operationally separate from the roller bearing members. The carrier may ensure that the operation of the anti-rotation members does not interfere with the operation of the roller bearing members. Dividers may be integrally formed with the carrier to maintain the anti-rotation members operationally separate from the roller bearing members.

The anti-rotation members may comprise sprags. The sprags may be three-dimensional sprags, although conventional sprags or two-dimensional sprags may also be used. The sprags may have a first or free-wheeling orientation, permitting rotation in the preferential direction. In the first orientation the sprags may contact the engagement surfaces of the second groove in a free-wheeling arrangement, permitting the inner and outer races to rotate relative to each other. The sprags may also have a second or locking orientation, preventing rotation in the non-preferential direction, wherein the sprags contact the engagement surfaces of the groove in a locking manner.

The carrier may include spring members for maintaining the sprags in their first orientation during rotation in the preferential direction. The spring members may be selected to impart spring forces to the sprags effective to allow for relative rotation between the inner and outer races in the preferential direction with minimal or no resistance.

However, the spring forces may preferably be selected to allow the sprags to readily move from their first orientation to their second orientation, whereby the sprags prevent relative rotation between the inner and outer races in the non-preferential direction.

The spring members may be integrally formed with the carrier. Integrally forming the carrier and spring members can increase simplicity in manufacturing and assembling the apparatus of the invention. In a preferred aspect of the invention, the carrier and integral spring members may have a one-piece construction, further simplifying manufacturing and assembly of the apparatus. The one-piece carrier with integral spring members may be formed from a plastic or polymer, and may be formed using extrusion techniques.

The spring members may be separate from the carrier. The spring members may be provided between the sprags and surfaces of the carrier to bias the springs into the first orientation. The sprags may include a recessed groove or slot for at least partially securing the spring member therein.

In yet another aspect of the invention, a single spring member may be used to bias all of the sprags into the first orientation. A pair of fingers extending from a side of the sprags may be configured to receive the spring member therebetween to bias the sprags into the first orientation. In addition, the spring member may maintain the sprags and rolling bearings operationally separate, thereby eliminating the need for a separate carrier member.

According to an aspect of the invention, the rolling bearings may comprise thrust rollers. The thrust rollers may be positioned between the inner and outer races. Thrust lips may be formed on both the inner and outer races to maintain the thrust rollers in position between the races. The thrust lips and thrust rollers may combine to transmit axial, tilt, and radial loads between the inner and outer races.

BRIEF DESCRIPTION OF DRAWINGS

FIG. 3 is a section view taken along line 3—3 of the one-way bearing of FIG. 2;

FIG. 4 is a front elevation view of a carrier for the one-way bearing of FIG. 1;

FIG. 5 is a section view of the carrier taken along line 5—5 of FIG. 4;

FIG. 6 is a section view of a one-way bearing in accordance with an aspect of the invention;

FIG. 7 is a section view taken along line 7—7 of the one-way bearing of FIG. 6;

FIG. 8 is a section view of a one-way bearing in accordance with an aspect of the invention;

FIG. 9 is a section view taken along line 9—9 of the one-way bearing of FIG. 9;

DETAILED DESCRIPTION OF PREFERRED EMBODIMENTS

The invention is preferably embodied in apparatus and methods for allowing relative rotation between a first member and a second member in a preferential direction while preventing relative rotation in an opposite, non-preferential direction. The apparatus and methods are preferably embodied in one-way bearings configured to minimize size, provide sufficient locking force against rotation in the non-preferential direction, and withstand axial, radial, and tilt forces.

FIGS. 1–5 illustrate apparatus for allowing relative rotation in a preferential direction between two members and preventing relative rotation in an opposite, non-preferential direction in accordance with an aspect of the invention. The apparatus comprises a one-way bearing 1 having a single pair of dedicated concentric outer and inner races 10 and 20. A plurality of thrust rollers 30 are positioned between the outer and inner races 10 and 20 for transmitting axial, radial, and tilt loads therebetween. Also positioned between the outer and inner races 10 and 20 are a plurality of three-dimensional sprags 40. The sprags 40 are configured to allow relative rotation between the outer and inner races 10 and 20 in the preferential direction, while preventing relative rotation between the outer and inner races 10 and 20 in the non-preferential direction, as will be described in more detail below.

Figure 1:
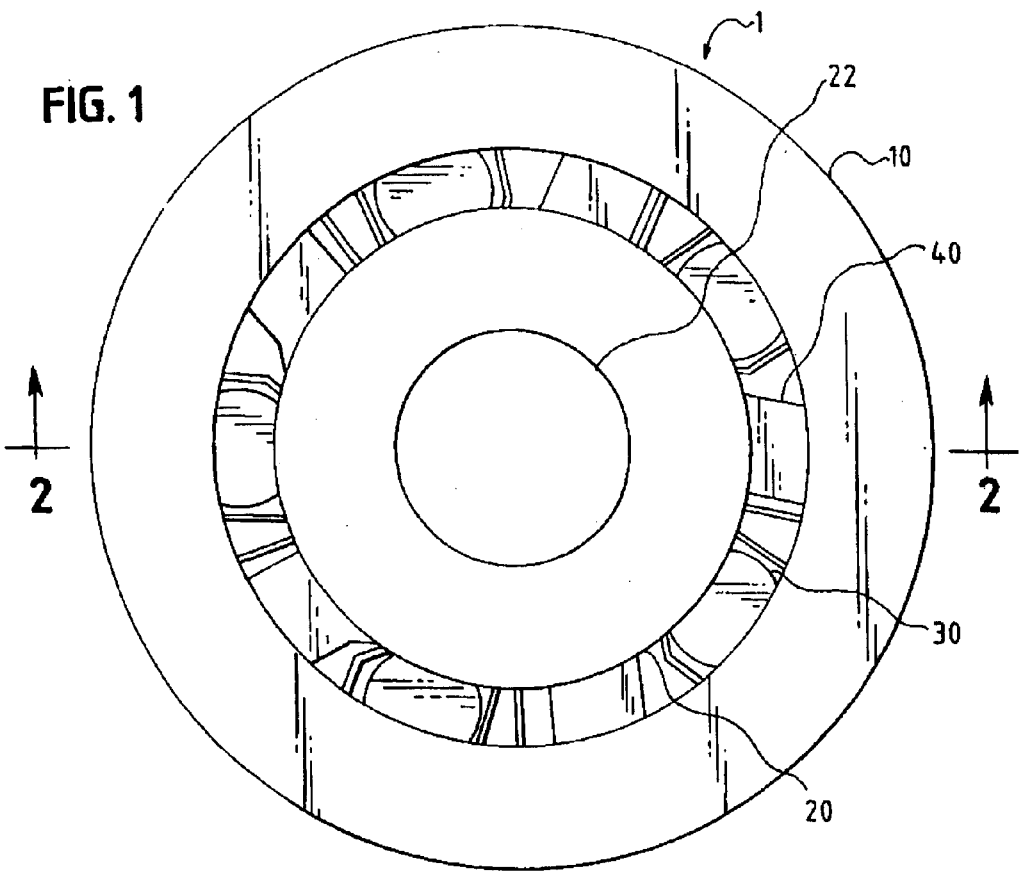
FIG. 1 is a front elevation view of a one-way bearing in accordance with an aspect of the invention.
Figure 2:
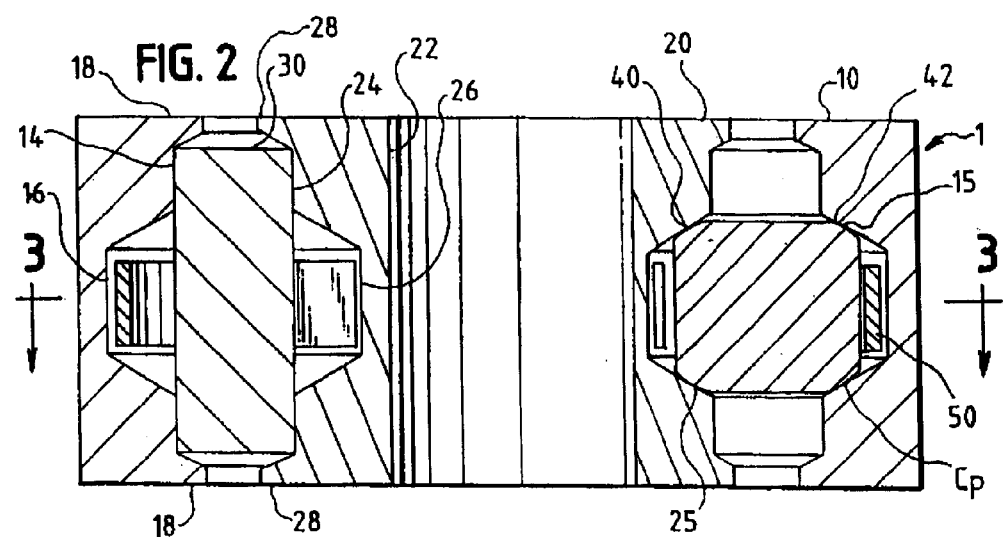
FIG. 2 is a section view taken along line 2—2 of the one-way bearing of FIG. 1.

As illustrated in FIG. 2, the outer and inner races 10 and 20 have both the thrust rollers 30 and sprags 40 positioned therebetween. The outer and inner races 10 and 20 each have a first groove 14 or 24 extending to a first depth for maintaining the thrust rollers 30 in position. The first grooves 14 and 24 each define thrust lips 18 and 28 for allowing the thrust rollers 30 to transmit axial loads between the outer and inner races 10 and 20. However, the thrust lips 18 and 28 may comprise separate components joined to the races 10 and 20 for maintaining the thrust rollers 30 therebetween. During axial or tilt loads, ends of the thrust rollers 30 engage the thrust lips 18 and 28 to transmit the loads between the outer and inner races 10 and 20.

Within each of the first grooves 14 and 24 are second grooves 16 and 26 extending to a second depth for maintaining the sprags 40 therebetween. Thus, the thrust rollers 30 are positioned between the opposing first grooves 14 and 24 of the outer and inner races 10 and 20, and the sprags 40 are positioned between the opposing second grooves 16 and 26, the second grooves 16 and 26 each respectively concentric with the first grooves 14 and 24.

Although thrust rollers 30 are described herein, other types of thrust rollers or rolling bearings may also be suitable for use according to aspects of the invention. Also, the use of thrust rollers with leveraged thrust bearings is also contemplated by aspects of the invention. Thick waist thrust rollers may also be used.

The sprags 40 are movable between a first or free-wheeling orientation and a second or locking orientation. In the first orientation, the sprags 40 permit relative rotation between the outer and inner races 10 and 20 in the preferential direction. When in the first orientation, the configuration of the sprags 40 allows for limited or reduced friction contact between the sprags 40 and the second grooves 16 and 26. The sprags 40 move to their second orientation when relative rotation is attempted between the outer and inner races 10 and 20 in the non-preferential direction to prevent relative rotation therebetween. In the second orientation, contact points $C_p$ on angled surfaces 42 disposed at opposing ends of the sprags 40 engage corresponding angled surfaces 15 and 25 of the second grooves 16 and 26 of the outer and inner races 10 and 20, respectively. In the second orientation the sprags 40 are thus wedged between the outer and inner races 10 and 20 to prevent relative rotation therebetween in the non-preferential direction.

As the sprags 40 move from their first orientation to their second orientation, normal forces and frictional forces between the grooves 16 and 26 of the outer and inner races 10 and 20 and the sprags 40 increase. When the friction forces between the sprags 40 and the grooves 16 and 26 equals the relative rotational force between the outer and inner races 10 and 20 in the non-preferential direction, relative rotation between the outer and inner races 10 and 20 in the non-preferential direction is prevented. The movement of the sprags 40 from their first orientation to their second orientation and the corresponding increase in the friction forces between the sprags 40 and the outer and inner races 10 and 20 preferably occurs essentially instantaneously. However, a delay between relative rotation in the non-preferential direction and prevention thereof may occur and is still considered to be within the scope of the present invention.

A carrier 50, as illustrated in FIG. 3, is placed between the outer and inner races 10 and 20 for maintaining the sprags 40 and thrust rollers 30 operationally separate from each other. In addition, the carrier 50 also includes a plurality of spring members 56 for biasing the sprags 40 into their first orientation, whereby relative rotation between the outer and inner races 10 and 20 in the preferential direction is permitted. Each spring member 56 provides an independent spring biasing force sufficient to maintain the sprags 40 in their first orientation during relative rotation between the outer and inner races 10 and 20 in the preferential direction. However, the spring biasing force is selected to position the sprags for ready movement to their second orientation when relative rotation between the outer and inner races 10 and 20 is attempted in the non-preferential direction.

As illustrated in FIG. 4, the carrier 50 is formed of a one-piece construction, generally comprising an circular outer ring 52. The outer ring 52 may generally form a continuous circle. A gap 57 may be defined by the outer ring 52 for use with a retaining ring. Attached to the outer ring 52 are a plurality of separating members 54 extending generally inward. The separating members 54 are substantially linear, but each has an angled portion 59 at the inward end thereof. Also attached to the outer ring 52 are a plurality of inwardly extending spring support members 58 having the spring members 56 connected at inward ends thereof. The spring members 56 extend radially outwardly with respect to the inward ends of the support members 58 and at an angle θ with respect thereto. The spring supports 58 and separating members 54 define spaces therebetween for receiving the thrust rollers 30 and maintaining the thrust rollers 30 operationally separate from the sprags 40. The sprags 40 are positioned between the spring members 56 and the angled portions 59 of the separating members 54 and thus are separated from the thrust rollers 30.

Preferably, the end of the spring member 56 opposite the spring support 58 and the angled portion 59 of the separating member 54 contact the sprag 40 at opposite sides and proximate the upper and lower extremes, respectively. Applying the spring preload forces to the sprags 40 in this manner permits the carrier 50 to operate in the second or inner grooves 16 and 26 of the outer and inner races 10 and 20, thereby limiting interference between the spring forces being applied by the carrier 50 and the operation of the thrust rollers 30. Furthermore, applying the spring preload forces to the sprags 40 at their upper and lower extremes can provide a large torque moment arm (not shown), and thus a large preload torque to the sprags 40.

The carrier 50 is formed of a material lending itself to inexpensive mass production. For example, a plastic or polymer may be used to form the carrier 50. The carrier 50 may also be made of a material having self-lubricating or other low-friction properties. The carrier profile may be extruded in a continuous tube and the individual carriers 50 cut from an end of the tube. The carrier 50 may also be formed of metal or other suitable materials. For example, steel or spring steel may be suitable for cryogenic applications of the one-way bearing. A phase change, superlastic material may also be used, such as from martensitic to austenitic. The phase change material may allow for greater bending angles and may be used for cyrogenic applications without out-gassing.

It is estimated that the length of the spring members 56 and separating members 54 necessary to preload each sprag 40 is between 4.25 and 4.75 times the diameter D of the sprag 40, and preferably 4.5 times the diameter D of the sprag 40. Using the preferred length of the spring members 56 and separating members 54, and the bend angles typically available for plastic materials, typically 6 degrees, a preferred angle θ between the spring members 56 and the spring supports 58 can be derived using the following equation:

$$4.5D(6/360)2\pi = 2(D/2)\theta$$

or $$\theta = 4.5\pi/30$$

where θ is in radians
Using the above calculation, the angle θ between the spring members 56 and the spring supports 58, when the carrier 50 is formed of a plastic or polymer, may be about 27 degrees.

A similar calculation can be performed to derive the preferred angle θ between the spring members 56 and the spring supports 58 when the carrier is formed of a metal, such as steel, which may have a useful bending angle of, typically, 3 degrees. The following equation may be used to derive the preferred angle θ:

$$4.5D(3/360)2\pi = 2(D/2)\theta$$

or $$\theta = 4.5\pi/60$$

where θ is in radians
Using the above calculation, the angle θ between the spring members 56 and the spring supports 58, when the carrier 50 is formed of a metal, may be about 13.5 degrees.

Figure 14:
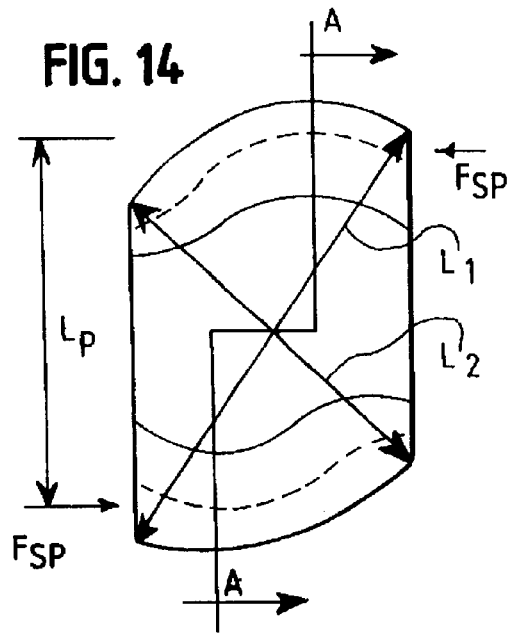
FIG. 14 is a front elevation view of a sprag in accordance with an aspect of the invention.
Figure 15:
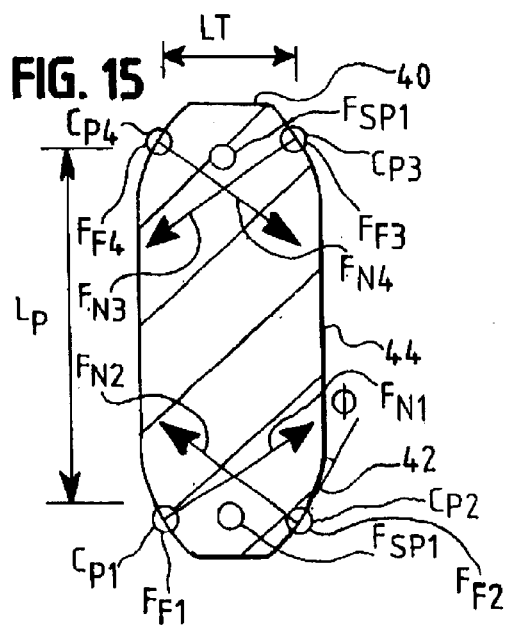
FIG. 15 is a section view taken along line 15—15 of FIG. 14.

As mentioned above, the sprags 40 comprise three-dimensional sprags, such as illustrated in FIGS. 14 and 15. The sprag 40 has a carefully selected profile effective to permit relative rotation between the outer and inner races 10 and 20 in the preferential direction, but to prevent relative rotation therebetween in the non-preferential direction. Three dimensional sprags are discussed in greater detail in U.S. Pat. No. 5,482,144 to Varnish, the disclosure of which is fully incorporated herein by reference.

As shown in FIG. 14, the sprags 40 have a generally parallelogram shape, including a major diagonal dimension $L_1$ and a minor diagonal dimension $L_2$, where the length of the minor diagonal dimension $L_2$ is less than the length of the major diagonal dimension $L_1$. When there is relative rotation between the outer and inner races 10 and 20 in the preferential direction, the sprags 40 are positioned in their first orientation by the spring members 56 such that the minor diagonal dimension $L_2$ is generally between the races 10 and 20. When the relative rotation between the outer and inner races 10 and 20 is attempted, the sprags 40 move into their first orientation, whereby the major diagonal dimension is generally between the races 10 and 20 to prevent relative rotation in the non-preferential direction.

When in its second orientation, each sprag 40 is seated between the second grooves 16 and 26 of the outer and inner races 10 and 20, as illustrated in FIG. 2. The contact points $C_P$ of the sprags 40, discussed above, engage the corresponding angled surfaces 15 and 25 of the second grooves 16 and 26. As illustrated in FIG. 15, the sprags 40 each have a moment arm length due to sprag thickness $L_T$, extending between the contact points $C_{P3}$ and $C_{P4}$ or $C_{P1}$ and $C_{P2}$ at either end thereof. The sprags 40 each also have a preload moment arm length $L_P$, measured between opposing contact points $C_{P1}$ and $C_{P4}$ or $C_{P2}$ and $C_{P3}$. The spring preload forces from the spring members $F_{SP1}$ contact the sprags 40 proximate their upper extremes, while the spring preload forces from the angled portions of the separating members $F_{SP2}$ contact the sprags 40 proximate their lower extremes.

Friction forces $F_{F1}$, $F_{F2}$, $F_{F3}$, and $F_{F4}$ between the angled surfaces 42 of the sprags 40 and the second grooves 16 and 26 extend parallel to the angled surfaces 42 at each contact point $C_{P1}$, $C_{P2}$, $C_{P3}$ or $C_{P4}$. The friction forces are in part dependent upon a coefficient of friction $\mu_S$ between the angled surfaces 42 of the sprags 40 and the second grooves 16 and 26. The coefficient of friction may be determined, in part, according to the materials comprising the sprags 40 and the races 10 and 20, and the presence and properties of any lubricants therebetween. The angled surfaces 42 are each an angle $\phi$ relative to sides 44 of the sprags 40.

Perpendicular to the friction forces at each of the contact points are normal forces $F_{N1}$, $F_{N2}$, $F_{N3}$, and $F_{N4}$ exerted between the contact points and the angled surfaces 15 and 25 of the second or inner grooves 16 and 26.

The sprag 40 is properly seated between the outer and inner races 10 and 20 when all four contact points $C_{P1}$, $C_{P2}$, $C_{P3}$ and $C_{P4}$ are in contact with the corresponding angled surfaces 15 and 25 of the second grooves 16 and 26. The conditions under which all four contact points are engaged can be determined by first assuming a condition where only three of the four contact points are engaged. When three of the four contact points are engaged, the sum of the moments about any one of the those three contact points is equal to zero due to engagement with the respective race 10 or 20. For example, the sum of the moments about the second contact point $C_{P2}$ can be expressed by the following equation:

$$\Sigma M_{CP2} = 0$$

Accordingly, the following equation can be derived therefrom:

$$F_{N3}(\cos \phi)L_P - F_{N3}\mu_S(\sin \phi)L_P \geq F_{N1}(\sin \phi) L_T + F_{N1}\mu_S(\cos \phi)L_T$$

At the moment of tip of the sprag 40, as it moves from its first or free-wheeling orientation to its second or locking orientation, it can be assumed that the first and third contact point normal forces $F_{N1}$ and $F_{N3}$ are approximately equal, and that the second contact point normal force $F_{N2}$ approaches zero. Under these assumptions, the preceding equation can be reduced to the following equation:

$$\frac{(L_P)}{(L_T)} \frac{(\cos\phi - \mu_S\sin\phi)}{(\sin\phi + \mu_S\cos\phi)} \geq 1$$

Using the preceding equation, the conditions and sprag 40 configuration can be determined when all four contact points are engaged and the sprag 40 is properly seated.

Using the above equation, the ratio between the preload moment arm length $L_P$ and the thickness moment arm length $L_T$ of the sprags 40 can be selected to ensure good seating of the sprags 40, and ensure each of the four sprag contact points $C_{P1}$, $C_{P2}$, $C_{P3}$ and $C_{P4}$ are engaged with the angled surfaces 15 and 25 of the second grooves 16 and 26 of the races 10 and 20. To ensure seating of the sprag 40, it is desirable to configure the sprag 40 to maximize the preload moment arm length $L_P$ and minimize the thickness moment arm length $L_T$. Accordingly, a sprag 40 both thin and long may be selected to increase the ratio of the preload moment arm length $L_P$ to the thickness moment arm length $L_T$ to ensure proper seating of the sprag 40 between the outer and inner races 10 and 20.

FIGS. 6 and 7 illustrate another apparatus for allowing relative rotation between two members in a preferential direction and preventing rotation in an opposite, non-preferential direction. The apparatus comprises a one-way bearing 100 similar to the one-way bearing 1 described above and illustrated in FIGS. 1–5. However, instead of three-dimensional bearings 40, two-dimensional bearings 140 are used. The two-dimensional bearings 140 and the thrust rollers 130 are both retained between a single pair of dedicated concentric outer and inner races 110 and 120. Also, instead of a carrier 50, a continuous circular spring is used for both applying the preload spring force to the sprags 140 and limiting interference between the sprags 140 and the thrust rollers 130.

An aligned pair of single grooves 114 and 124 are provided in the outer and inner races 110 and 120 for maintaining the sprags 140 and thrust rollers 130 therebetween, as illustrated in FIG. 7. The sprags 140 have surfaces with contact points therein positioned between the grooves 114 and 124 for engagement therewith. As with the above-discussed three-dimensional sprags 40, the two-dimensional sprags 140 have a first orientation permitting relative rotation between the outer and inner races 110 and 120 in the preferential direction, but are movable to a second position whereby relative rotation in the non-preferential direction is prevented by engagement of the sprags 140 between the grooves 114 and 124.

The sprags 140 each include a pair of fingers 142 extending outwardly from a side thereof. The fingers 142 define a slot 144 therebetween for receiving the spring member 150, which may comprise a continuous coil spring. When the sprags 140 are position between the races 110 and 120, the spring member 150 may be inserted into the slots 144 to interconnect the sprags 140, as illustrated in FIG. 6. Each slot 144 may extend at an angle effective to cause the spring member 150 to bias the sprags 140 into their first orientation and apply a spring preload force thereto. The angle of the slots 144 may also be effective to allow the spring member 150 to maintain the sprags 140 operationally separate from the thrust rollers 130 to reduce or eliminate interference therebetween. The slots 144 are preferably positioned above the ends of the thrust rollers 130 to reduce or eliminate interference between the thrust rollers 130 and the spring member 150.

FIGS. 8–11 illustrate another apparatus for allowing relative rotation between two members in a preferential direction and preventing rotation in an opposite, non-preferential direction. The apparatus comprises a one-way bearing 200 similar to the one-way bearing 1 described above and illustrated in FIGS. 1–5. The bearing 200 has a single pair of dedicated concentric outer and inner races 210 and 220 with a plurality of both thrust rollers 230 and three-dimensional sprags 240 positioned therebetween. However, instead of the unitary carrier 50 and spring members 56, the one-way bearing 200 uses a carrier 250 having separate spring members 260, as will be described in more detail below.

Figure 10:
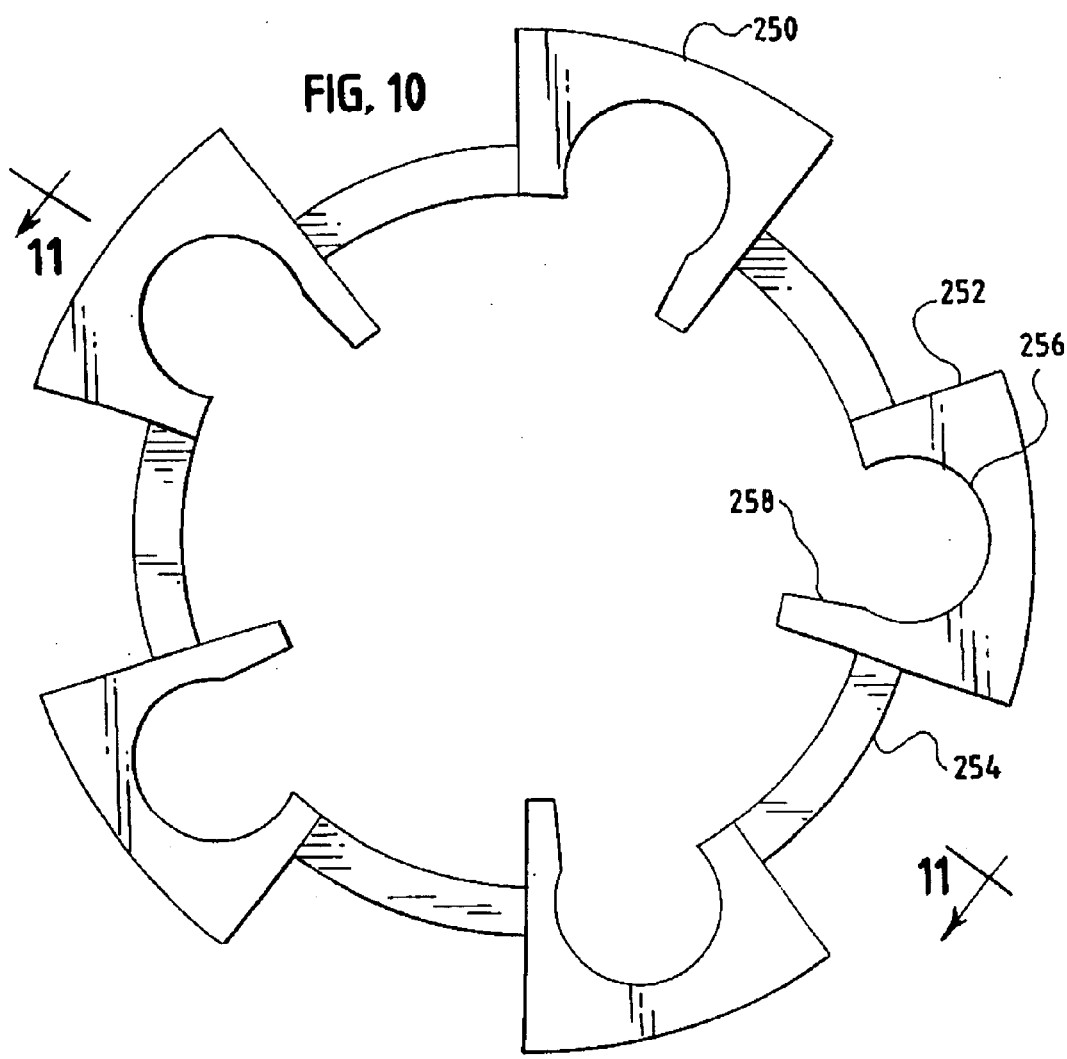
FIG. 10 is a front elevation view of a carrier for the one-way bearing of FIG. 8.

The carrier 250 is generally circular in shape, as illustrated in FIG. 10, and includes a plurality of retainers 252 for the thrust rollers 230. The retainers 252 are each generally U-shaped and have an inwardly extending separating member 258 for one of the legs of the U-shape. The retainer 252 defines a groove 256 in which the thrust rollers 230 are positioned. Extending between adjacent retainers 252 are connecting ring segments 254.

The sprags 240 are positioned between the adjacent retainers 252, as illustrated in FIG. 8. The spring members 260, which may comprise coil springs, are disposed between the retainers 252 and the upper ends of the sprags 240 to provide the spring preload forces to bias the sprags 240 into their free-wheeling orientations. The sprags 240 have a slot 244 formed in the their upper ends for securely receiving the spring member 260 and maintaining the spring member 260 therein. Similar to the spring members 56 described above, the spring members 260 have a spring force effective to position the sprags 240 to allow relative rotation between the outer and inner races 210 and 220 in the preferential direction, but also sufficient to allow the sprags 240 to readily move to their locking orientation when relative movement in the non-preferential direction is attempted.

Figure 11:
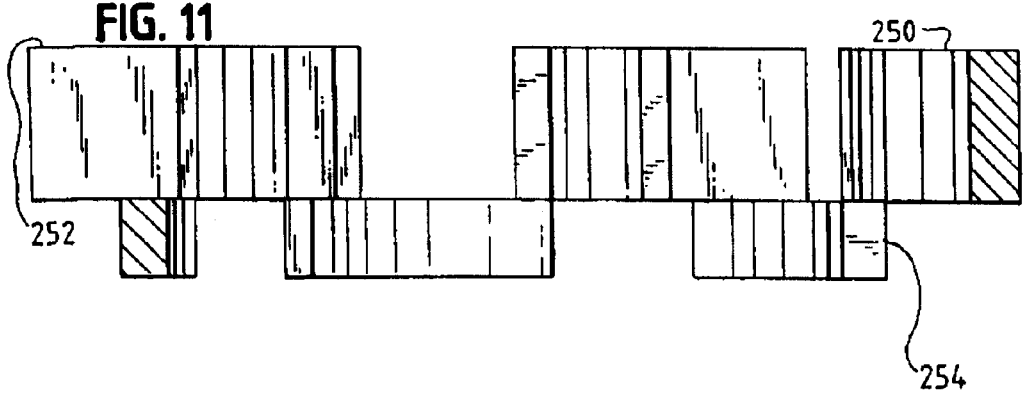
FIG. 11 is a section view taken along line 11—11 of the race of FIG. 10.

As illustrated in FIG. 11, the connecting ring segments 254 are positioned at different elevations from the retainers 252. The elevations of the connecting ring segments 254 are selected to allow the segments 254 to be recessed within first grooves 214 and 224 of the outer and inner races 210 and 220, thus allowing the sprags 240 to operate without interference therefrom, as illustrated in FIG. 9. The elevations of the retainers 252 are selected to position the retainers 252 within second grooves 216 and 226 formed within the outer and inner races 210 and 220, allowing for the thrust rollers 230 to operate unhindered.

Figure 12:
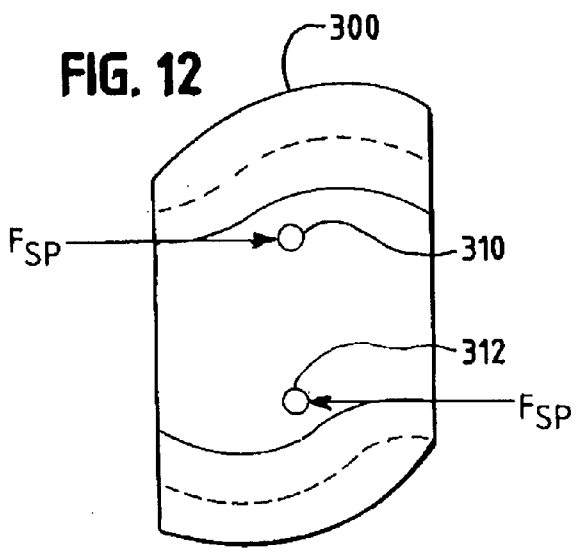
FIG. 12 is a front elevation view of a prior art sprag.
Figure 13:
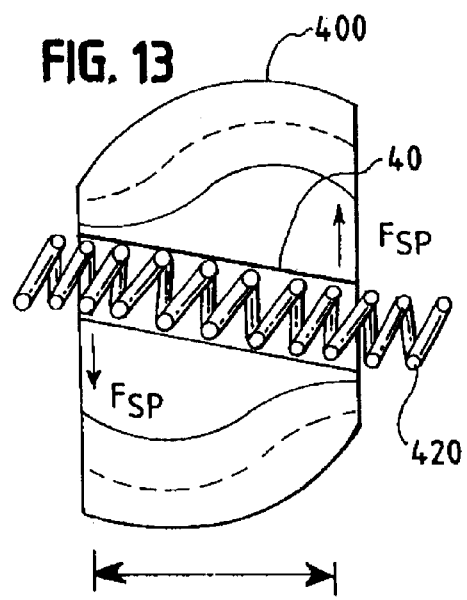
FIG. 13 is a front elevation view of another prior art sprag.

Although several methods of providing spring preload forces to the sprags 40, 140, and 240 are discussed above, other methods may be equally suitable and are contemplated by the invention. For example, prior art methods of applying spring forces to sprags are illustrated in FIGS. 12 and 13. Two bores 310 and 312 may be provided in the sprag 300 of FIG. 12. Springs may be inserted into the bores 310 and 312 for applying the spring preload force to the sprag 300 and positioning the sprag 300 in its first orientation. In addition, a sprag 400 may have an angled groove 410 formed in its side or even therethrough for receiving a spring member 420, as illustrated in FIG. 13. The spring member 420 may be a continuous spring member connecting some or all of the sprags 400, such as the spring member 260 discussed hereinabove. While these prior art methods may not leave room for the thrust rollers to be placed between the same pair of dedicated concentric races, the methods may be modified according to aspects of the invention and configured to reduce or eliminate interference between the rollers and the sprags.

The one-way bearings 1, 100, and 200 described above may be provided with bores 22, 122, and 222 through the inner races 20, 120, and 220 for receiving a shaft. Bores may also be provided having profiles configured to mate with a shaft.

From the foregoing, it will be appreciated that the invention provides apparatus and methods for allowing relative rotation between two members in a preferential direction and preventing rotation in an opposite, non-preferential direction by use of sprags and rolling bearings between a common pair of dedicated concentric races. The invention is not limited to the embodiments described hereinabove or to any particular embodiments. For example, it is contemplated that the aspects of the invention described above may be combined into various configurations.

The invention is defined more particularly by the following claims.

What is claimed is:

1. A bearing adapted for permitting one-way rotation, the bearing comprising:
    an inner race; an outer race concentrically disposed around the inner race, the outer race being spaced from the inner race;
    a plurality of rollers disposed between the inner and outer races for transmitting radial, tilt, and axial loads therebetween;
    at least one sprag disposed between the inner and outer races, the sprag having a first orientation being effective to allow free rotation of the outer race relative to the inner race in a first direction and a second orientation being effective to prevent rotation of the outer race relative to the inner race in a second direction opposite the first direction; and
    first and second concentric grooves formed in the outer race and first and second concentric grooves formed in the inner race, said plurality of rollers being positioned for engaging the first grooves and the spray being positioned for engaging the second grooves.

2. A bearing according to claim 1, wherein the sprag includes a first pair of opposing contact points on a first end of the sprag and a second pair of opposing contact points on a second end of the sprag opposite the first end of the sprag, the first and second pair of contact points being adapted to engage the second grooves of the inner and outer races when the sprag is in the second orientation to prevent relative rotation therebetween.

3. A bearing according to claim 2, wherein the sprag has a thickness preload moment arm defined as extending laterally between either the opposing first or second pair of contact points, and a length preload moment arm defined as longitudinally extending between respective ones of the first and second contact points, the ratio of the length preload moment arm to the thickness preload moment arm being selected to provide for seating of the sprag in the second orientation between the second grooves of the inner and outer races.

4. A bearing according to claim 1, wherein a carrier is disposed between the inner and outer races for maintaining the roller operationally separate from the sprag, the carrier having spring members providing a spring preload force to the sprag to bias the sprag into the first orientation.

5. A bearing according to claim 4, wherein the carrier is formed from a polymer.

6. A bearing according to claim 4, wherein the carrier is formed from a self-lubricating material.

7. A bearing according to claim 1, wherein said plurality of rollers comprises thrust rollers positioned to engage thrust lips defined by the first grooves for transmitting axial forces between the inner and outer races.

8. A bearing according to claim 1 wherein said first and second concentric grooves are aligned.

9. A method of allowing rotation in a first direction and preventing rotation in a second direction opposite the first direction, the method comprising:

providing a inner race;
positioning an outer race concentrically around the inner race; providing plurality of rollers between the inner and outer races for transmitting radial, tilt, and axial loads therebetween;

providing at least one spray between the inner and outer races, the sprags having a first orientation permitting rotation of the outer race relative to the inner race in the first direction and a second orientation preventing rotation of the outer race relative to the inner race in the second direction, and providing first and second concentric grooves formed in the outer race and first and second concentric grooves formed in the inner race, said plurality of rollers being positioned for engaging the first grooves and the sprag being positioned for engaging the second grooves.

10. A method in accordance with claim 9, comprising:
positioning the sprags in a carrier, the carrier being adapted to operationally separate the sprags from the rollers; and
applying a spring preload force to the sprags with spring members, the spring preload force effective to maintain the sprags in the first orientation when rotation of the outer race relative to the inner race is in the first direction and allow the sprags to move to the second orientation to prevent rotation of the outer race relative to the inner race in the second direction.

11. A method in accordance with claim 10, including forming the spring members integrally with the carrier.

12. A method in accordance with claim 10, wherein the rollers comprise thrust rollers positioned to engage thrust lips defined by the inner and outer races for transmitting axial loads therebetween.

13. A method in accordance with claim 10, wherein the sprags comprise 3D sprags having a first set of opposing contact points at a first end thereof, and a second set of opposing contact points at a second end thereof, the first and second sets of opposing contact points effective to engage the second grooves of the inner and outer races when the spray is in the second orientation to prevent relative rotation therebetween.

14. A method in accordance with claim 13, wherein each sprag has a longitudinal dimension extending between one of the first contact surfaces and one of the second contact surfaces and a lateral dimension extending between either of the first or second sets of contact surfaces, the method comprising selecting a ratio of the longitudinal dimension to the lateral dimension of the sprag to provide for engagement between the first and second contact surfaces and the first set of inner and outer race contact surfaces when the sprag is in the second orientation to prevent relative rotation between the outer and inner races.

15. A bearing adapted for permitting one-way rotation, the bearing comprising:

an inner race;

an outer race concentrically disposed around the inner race, the outer race spaced from the inner race;

a first groove and a second groove formed in both the inner and outer races, the second grooves concentrically oriented relative to the first grooves;

a plurality of thrust rollers disposed between the first grooves of the inner and outer race;

a plurality of sprags disposed between the second grooves of the inner and outer races, the sprags having a first orientation being effective to allow free rotation of the outer race relative to the inner race in a first direction, and a second orientation being effective to prevent rotation of the outer race relative to the inner race in a second direction opposite the first direction by engagement between the second groove of the outer race and the second groove of the inner race; and a carrier positioned between the inner and outer races, the carrier effective to maintain the rollers and sprags operationally separate, the carrier including spring members applying a spring force to the sprags effective to position the sprags in the first orientation when the outer race is rotated in the first direction relative to the inner race, the spring force being selected to allow the sprags to move to the second orientation to prevent rotation between the inner and outer races.

16. A bearing according to claim 15, Wherein the sprags each include a first pair of opposing contact surfaces on a first end of the sprag and a second pair of opposing contact surface on a second end of the sprag opposite the first sprag end, the first and second pair of contact surfaces being adapted to engage the second grooves of the inner and outer races when the sprags are in the second orientation to prevent relative rotation therebetween.

17. A bearing according to claim 16, wherein the sprags each have a thickness preload moment arm dimension defined as laterally extending between either of the opposing first or second pair of contact surfaces, and a length preload moment arm dimension defined as longitudinally extending between respective ones of the first and second contact surfaces, the ratio of the length preload moment arm to the thickness preload moment arm being selected to provide for seating of the sprag in the second orientation between the second grooves of the inner and outer races.

* * * * *